United States Patent
Saldanha et al.

(10) Patent No.: US 8,775,248 B1
(45) Date of Patent: Jul. 8, 2014

(54) ADVERTISING CONVERSION ATTRIBUTION

(71) Applicant: Abakus, Inc., Emeryville, CA (US)

(72) Inventors: Alexander Saldanha, Berkeley, CA (US); Ron Berman, San Francisco, CA (US); Keshore Vummarao, San Ramon, CA (US)

(73) Assignee: Abakus, Inc., Emeryville, CA (US)

( * ) Notice: Subject to any disclaimer, the term of this patent is extended or adjusted under 35 U.S.C. 154(b) by 0 days.

(21) Appl. No.: 13/830,618

(22) Filed: Mar. 14, 2013

(51) Int. Cl.
*G06Q 30/00* (2012.01)

(52) U.S. Cl.
USPC ........................ 705/14.4; 705/14.34

(58) Field of Classification Search
None
See application file for complete search history.

(56) References Cited

U.S. PATENT DOCUMENTS

| | | | |
|---|---|---|---|
| 2008/0162281 A1* | 7/2008 | Davis et al. | 705/14 |
| 2009/0089152 A1* | 4/2009 | Davis et al. | 705/10 |
| 2010/0042387 A1* | 2/2010 | Gibbon et al. | 703/6 |
| 2011/0173047 A1* | 7/2011 | Kelley | 705/7.33 |
| 2011/0307509 A1* | 12/2011 | Hsiao et al. | 707/769 |
| 2012/0029987 A1* | 2/2012 | Kusumoto et al. | 705/14.16 |
| 2012/0109882 A1* | 5/2012 | Bouse et al. | 707/607 |
| 2013/0166364 A1* | 6/2013 | Kusumoto et al. | 705/14.16 |
| 2013/0211910 A1* | 8/2013 | Yerli | 705/14.53 |

* cited by examiner

*Primary Examiner* — Matthew T Sittner
(74) *Attorney, Agent, or Firm* — Fenwick & West LLP (57) ABSTRACT

An advertising attribution system determines an attribution value for a set of advertising modalities associated with a conversion event. The modalities each provided an advertisement to a user who performed the conversion event. A conversion value associated with each of a plurality of modality subsets is determined representing the value to the advertiser of providing advertisements by the modalities in each modality subset. Based on the conversion value of each modality subset, a marginal value for each modality is determined for the set of modalities associated with the conversion event.

20 Claims, 8 Drawing Sheets

| Modality Subset | Value |
|---|---|
| S0 | 5 |
| S1 | 15 |
| S2 | 17 |
| S3 | 10 |
| S1, 2 | 22 |
| S1, 3 | 19 |
| S2, 3 | 21 |
| S1, 2, 3 | 25 |

300

| | Modality 1 | Modality 2 | Modality 3 |
|---|---|---|---|
| [S1, S2, S3] | 10 | 7 | 3 |
| [S1, S3, S2] | 10 | 6 | 4 |
| [S2, S1, S3] | 5 | 12 | 3 |
| [S2, S3, S1] | 4 | 12 | 4 |
| [S3, S1, S2] | 9 | 6 | 5 |
| [S3, S2, S1] | 4 | 11 | 5 |
| Marginal V(S) 315 | 7 | 9 | 4 |

| Modality Subset | Value |
|---|---|
| S0 | 5 |
| S1 | 15 |
| S2 | 17 |
| S3 | 10 |
| S1, 2 | 22 |
| S1, 3 | 19 |
| S2, 3 | 21 |
| S1, 2, 3 | 25 |

310

|  | Modality 1 | Modality 2 | Modality 3 |
|---|---|---|---|
| [S1, S2, S3] | 10 | 7 | 3 |
| [S1, S3, S2] | 10 | 6 | 4 |
| [S2, S1, S3] | 5 | 12 | 3 |
| [S2, S3, S1] | 4 | 12 | 4 |
| [S3, S1, S2] | 9 | 6 | 5 |
| [S3, S2, S1] | 4 | 11 | 5 |
| Marginal V(S) 315 | 7 | 9 | 4 |

ADVERTISING CONVERSION ATTRIBUTION

BACKGROUND

1. Field of Art

This disclosure generally relates to attributing conversion credit for transactions by consumers to advertising modalities.

2. Background

Advertisers may place advertisements to be viewed by a potential customer through a variety of advertising modalities. Advertising modalities are the mechanisms and methods by which an advertisement is delivered to a customer and may be characterized by a variety of attributes. For example, an attribute can include a particular channel of advertising distribution, such as a weekly flier, an email service, text messages, or internet advertisements (e.g. video, banner, and search ads on any form of digital content). Other attributes can include the time of day the message was posted or delivered, the size and shape of the advertisement, and the type of advertising, such as text, pictorial, or video advertising. The same potential customer (or "user") may be provided multiple advertisements by various modalities for the same advertiser. For example, a user may receive various advertising related to an advertiser, such as by a television advertisement in the morning, a small picture advertisement on an internet website at lunchtime, a text message as the user drives past the advertiser on the way home, and a large video advertisement on another internet website in the evening.

When the user views the advertisement, or at a later time, the user may visit the advertiser and perform a desired activity. This desired activity is termed a conversion. For many advertisers, a conversion is a product purchase, though the conversion may also be completing a survey, electing to receive additional information, or otherwise positively interacting with the advertiser. Conversion events are defined by the advertiser and broadly can be any event where a monetary value can be associated with the user activity.

Once a given user converts following exposure to the advertisers advertisements, it can be difficult for the advertiser to determine the contribution to the user's conversion of each different advertising modality that provided an advertisement to the user prior to the conversion. Since many conversions are the result of a user viewing several advertisements for the advertiser from various content providers, standard conversion attribution techniques, such as "last viewed," undervalue the contribution of earlier advertisements in convincing the user to convert to the advertiser. These techniques may also fail to account for multiple conversion events for the same user.

SUMMARY

An advertising attribution system is provided that identifies and allocates conversion credit to advertisements appearing in different advertising modalities based on the modality's contribution to the advertising campaign. The modality's contribution is based on the difference in conversion rates of users who viewed advertisements via that modality as compared to the conversion rates of users who viewed the modality's advertisements in addition to other advertisements by other modalities. The modalities that provided advertisements associated with the conversion event are included in a modality set. Modality subsets of the modality set are used to identify the conversion value provided to the advertiser when only modalities in the modality set provide advertisements to the users. Using these conversion values, the marginal value of each advertising modality is determined. One embodiment determines the marginal value by sequentially adding modalities to the modality subset and determining the resulting effect on the conversion values. Since the value of each modality may vary based on the order of adding the modalities, the marginal values may be calculated for each order permutation of modalities in the modality set. The marginal value of each modality in each order permutation is averaged to determine the marginal value of the modality for the conversion event.

In one embodiment, the advertisement attribution system includes a modality value module, and advertising event logs. The advertising event logs maintain a record of advertisements associated with attributes of the advertisements. The advertising event logs also maintain a record of users that were served particular advertisements and conversion events of the users. The modality value module accesses the advertising event logs and selects advertisements belonging to a set of advertising modalities. The modality value module is used to determine conversion rates of the users relative to subsets of the advertising modalities. The conversion rates are used to determine the marginal contribution of each advertising modality to the conversion rate of the set of advertising modalities.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Architecture Overview

Figure 1:
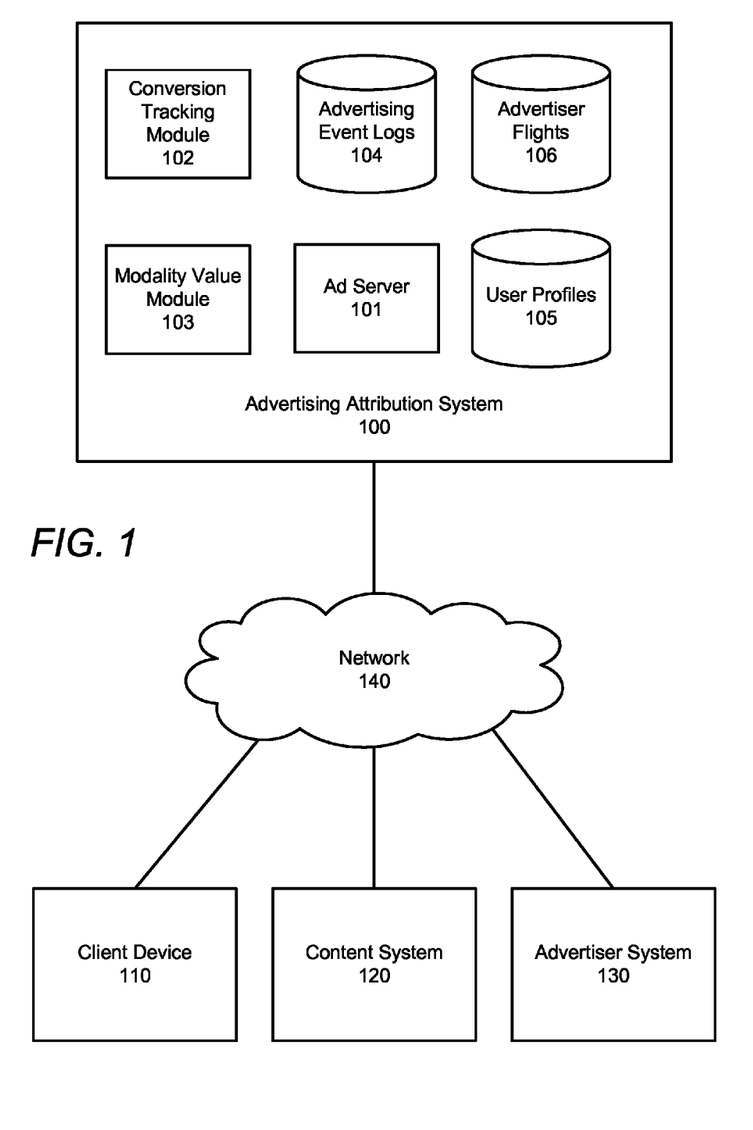
FIG. 1 is a block diagram of an advertising attribution system 100 for determining attribution for conversion events performed by a client device 110.

FIG. 1 is a block diagram of an advertising attribution system 100 for determining attribution for conversion events performed by a client device 110 according to one embodiment. In this embodiment, the advertising attribution system 100 also selects advertisements for advertising modalities related to content systems 120, though in other embodiments the advertising attribution system 100 does not manage selection of any advertising modalities. A user of a client device 110 accesses a content system 120 to obtain content, such as web pages, movies, music, and so forth. The content system 120, when providing content to the client device 110 will also provide advertisements ("ads") along with the content. The advertisements are selected by the advertising attribution system 100. To select an advertisement, the content system 120 includes a reference or universal resource locator (URL) with the content it provides to the client device. Typically, the reference is located in an advertising portion of a content page, such as a side bar or a top banner.

The client device 110 resolves this reference which results in a request for an advertisement to the advertising attribution system 100. The advertising attribution system 100 identifies an ad to provide to the user and serves the ad to the client device 110. Note that in FIG. 1, for the sake of clarity only one instance of content system 120, client device 110, and advertiser system 130 is shown, though in practice there will be any number of each.

When the client device 110 receives the advertisement or at another time, the user of the client device may use the ad to access the advertiser system 130, for example by clicking on a link in the ad. When the user does not access the advertiser system 130 through the advertisement, the advertisement may impact the user's propensity to convert. For example, the user may return to the advertiser's website at a future time without a click on any advertisement. At the advertiser's website, the user of the client device 110 may indicate an interest to the advertiser's message or product through some specific behavior, for example by purchasing an item using the advertiser system 130, completing a survey, requesting information, downloading information, applications, or other content from the advertiser system 130, interacting with the advertiser system 130 in some other predetermined manner. This behavior is termed a "conversion" or a "conversion event." The conversion event at the advertiser 130 provides a benefit to the advertiser 130 and is typically the goal of advertising. These conversion events are generally defined by the advertiser and are recorded to provide conversion information to the advertising attribution system 100.

Prior to completing the conversion event, the client device 110 may have received several advertisements for the advertiser. These advertisements may have been provided by a variety of advertising modalities, such as content systems 120, by direct messaging, or by any other advertising modality. When the conversion event occurs, information identifying the conversion event is transmitted to the advertising attribution system 100. The information includes information identifying the client device 110 (and/or the user), along with an identifier(s) used to determine the set of advertising modalities that provided advertisements that preceded the conversion event. Each advertisement is associated with an advertising modality, such as a content system 120 and particular advertiser flight. A flight is a set of ads for a given advertising campaign. Based on the advertisements that preceded the conversion event, the advertising attribution system 100 determines a portion of the value of the conversion event attributable to each advertisement and associated advertising modality. The advertising modalities that provided an advertisement prior to the conversion event is termed the modality set. The value of the conversion event attributable to each advertising modality is determined based upon a conversion rate of users that converted responsive to the ads in the modality set relative to the conversion rate of users that converted responsive to ads in subsets of the modality set. The value of the conversion event in one embodiment is calculated at predetermined periods, such as once a day or once an hour, and may determine the value of a group of conversions with the same set of advertisements. The value of the conversion attributable to each advertising modality that provided advertisements yielding the conversion is described further herein.

Though described above with reference to content publishers in a networked environment as an advertising modality, any advertising modality that may be effectively tracked with respect to conversions may be provided an attribution by the adverting attribution system 100. Advertising modalities may be distinguished by any attribute of the advertisement, such as the delivery mechanism of the advertisement, size of the advertisement, time of day the advertisement was served, publisher of the advertisement, etc, where data representing the attribute is recorded and transmitted to the system 100. Possible delivery mechanisms for advertising modalities include email advertisements, text messages, phone calls, other direct messaging, and other indirect messaging from which conversions may be tracked and determined. Thus, an advertisement provided on a website in the morning may be treated as a separate advertising modality from the same advertisement provided on the website in the afternoon. As another example, advertisements provided by email may be treated as one advertising modality, while advertisements provided by a webpage (i.e., any webpage) may be treated as another advertising modality. Thus, any set of advertising modalities may be used for distributing conversion attribution. Conversion events may also occur apart from an online environment and be registered with the advertising attribution system 100. For example, users may be associated with an address, and a survey comprising the conversion event is returned to the advertiser. The address on the survey is used to identify a user associated with a matching address.

The advertising attribution system 100 includes an ad server 101, a conversion tracking module 102, a modality value module 103, and various databases supporting these modules and functions. These databases include conversion event logs 104, user profiles 105, and advertiser flights 106. Conventional features, such as firewalls, load balancers, authentication servers, application servers, failover servers, site management tools, and so forth are not shown so as to more clearly illustrate the features of the advertising attribution system 100. In general, functions described in one embodiment as being performed by one component can also be performed by other components in other embodiments, or by a combination of components.

The advertising attribution system 100 in this embodiment selects and provides advertisements to the client device 110. Though shown here as a single entity, the particular advertiser 130 accessed by the client device 110 is determined based on the ad provided by the advertising attribution system 100 and the user actions. In addition, rather than the advertisement being provided by the advertising attribution system 100, the advertiser 130 may provide the advertisement directly to the client device 110, or through some other delivery mechanism. For example, the advertising attribution system 100 provides the user a reference to the advertiser 130 rather than directly providing the advertisement to the client device 110.

Client devices 110 are computing devices that execute client software, e.g., a web browser or built-in client application, to browse the internet and connect with content system 120 and advertising attribution system 100 via a network 140 to access content and accompanying advertisements. The client device 110 might be, for example, a personal computer, a personal digital assistant, a cellular, mobile, or smart phone, a laptop computer, a television set-top receiver, or any similar device capable of accessing content and advertisements over the a network 140. Client devices request content from the content system 120. The client devices 110 typically request information using hypertext transfer protocol (HTTP), though other access protocols can be used. The received content can include web pages based upon HTML, CSS, or Javascript, or other mark-up or scripting languages, and can also include video, audio, or other content types.

When the client device 110 accessing content on a content system 120 makes a request for an advertisement from the advertising attribution system 100, it includes in the request referrer link information to indicate to the advertising attribution system 100 information about the content system 120 and other context for the user's request. This information varies depending on the context of the advertising request. The information on a web browser may indicate the IP address of the browser making the request, along with a URL of specific page being viewed at the content system 120, and may include keywords from a search query. On a mobile device, the referrer link information may indicate the name of the application or other information about the context in which the user is operating. Mobile device applications may request permission from the user to identify the user's geographic location, which may be included in the referrer link information transmitted to the advertising attribution system 100.

The client device 110 retains a persistent identifier for its communication with the advertising attribution system 100. A persistent identifier can be any persistent information to identify the client device 110 to the advertising attribution system 100. The persistent identifier is typically a browser cookie or other piece of data maintained by the client device 110, though other information can also be maintained. The client device 110 may use unique browser cookies for each browser used on the device or for different users logged into the system. In addition, persistent identifiers are typically not unique to individual persons, but rather machine, browser, and user-specific. For example, a user browsing on a home computer will have a persistent identifier on the home computer which is distinct from a persistent identifier from a work computer. The same user will also have separate persistent identifiers associated with each type of browser they are using on a single device. Two users on the same computer that log in with separate identities will also have separate persistent identifiers. In addition, users may delete persistent identifiers from the client device 110. This causes a new persistent identifier to be generated for the device despite that there has been no change in device or user. As such, each persistent identifier may only identify particular devices and particular sessions. Other persistent identifiers are used in different implementations. For convenience, a reference herein to a "user" from the perspective of the advertising attribution system 100 should be understood to refer to the persistent identifier unless clearly indicated that the "user" actually means the particular individual operating a client device, rather than the persistent identifier representing a cookie or other session-related identifier of the client device which is not relied on to identify specific users.

The content system 120 can be any content source accessible by the client device 110 that provides advertisement selections from advertising attribution system 100. For example, the content system 120 may provide content pages using the technologies described above. The content can include news, video, informational pages, and various other types of information to the client device 110. Examples of content sources include social networks (e.g., FACEBOOK™), e-commerce sites (e.g., AMAZON™), news sites (e.g., CNN.com), blogs, user forums, video hosting services (e.g., YOUTUBE™, HULU™), audio hosting services (e.g., PANDORA™, SLACKER™) and so forth.

The network 140 provides a communications medium to enable correspondence between the advertising attribution system 100, the client device 110, the content system 120, and the advertiser 130. The network 140 is typically the Internet, but may be any network, including but not limited to a LAN, a MAN, a WAN, a wired or wireless network, a private network, or a virtual private network.

Advertising Attribution System

The advertising attribution system 100 includes various components and modules to enable the advertising attribution system 100 to determine attribution for advertising modalities and select advertisements for individual client devices 110. Using the persistent identifier maintained by the client device 110 (e.g. a browser cookie), the advertising attribution system 100 identifies advertisements to serve to the client device 110. The advertising attribution system 100 also identifies user behaviors from referrer information, creates and updates user profiles, and builds behavioral models using the user profiles. These functions are performed by the modules and components within the advertising attribution system 100. For clarity in this disclosure, certain particular modules and components are not illustrated or described herein beyond the extent required for illustrating aspects of this disclosure.

The system 100 may be implemented using a single computer, or a network of computers, including cloud-based computer implementations. The computers are preferably server class computers including one or more high-performance CPUs and 128 Gb or more of main memory, as well as 500 Gb to 2 Tb of computer readable, persistent storage, and running an operating system such as LINUX or variants thereof. The operations of the advertising attribution system 100 as described herein can be controlled through either hardware or through computer programs installed in computer storage and executed by the processors of such servers to perform the functions described herein. The advertising attribution system 100 includes other hardware elements necessary for the operations described here, including network interfaces and protocols, input devices for data entry, and output devices for display, printing, or other presentations of data. The functions and operations of the advertisement system 100 are sufficiently complex as to require implementation on a computer system, and cannot be performed in the human mind simply by mental steps.

The ad server 101 is a module within the advertising attribution system 100 for receiving ad requests from client devices 110 and providing an advertisement or direction to the client device 110 to receive an advertisement from an advertiser 130, and is one means for performing this function. The ad server 101 receives the ad request from the client device 110 together with a persistent identifier from the client device 110. The persistent identifier and referrer link information is received from the client device 110 and used to select an advertisement from advertiser flights 106 to provide to the client device 110. The persistent identifier and information about the client device 110 may be stored in user profiles 105. In various embodiments, the ad server 101 includes ad service and targeting modules and other logic for selecting particular advertising flights 106 for display to the user.

The advertiser flights 106 indicate the advertisers currently providing advertisements for the advertising attribution system 100 to serve to client devices. The advertiser flights 106 provide information about the advertising campaign by an advertiser. For example, the advertiser flights 106 typically include a total budget for the advertising flight, the time frame for the advertisements, the average value of a conversion, the average conversion ratio, particular advertising content (e.g., a list of advertisements to be selected from for this advertiser's particular campaign), and other information about the advertising flight. The advertiser flights 106 are provided by advertisers through an interface to the advertiser (not shown) or can be entered by an operator of the advertising attribution system 100, for example by a sales manager.

Though described here as serving advertisements in an online environment responsive to requests to access content system 120, the advertising attribution system 100 in various embodiments may select and distribute advertising using a variety of types of advertising modalities, such as by email, direct messaging, text message, by mail, or any other type of advertising modality. Additionally, the advertising attribution system 100 may record and track advertising by other entities and perform attribution including advertising modalities performed by these other entities.

When a conversion event occurs, the advertiser 130 communicates the conversion event to the advertising attribution system 100, which is received by the conversion tracking module 102. The conversion tracking module identifies a user profile from the user profiles 105 to associate with the conversion event, for example based on an identifier of the client device 110. The conversion tracking module 102 also identifies the content systems 120 that provided advertisements prior to a user conversion. For example, a user may browse to five different content systems 120 (e.g. various websites) that each provides an advertisement to the user for the advertiser 130. After viewing the advertisements, the user may finally access the advertiser 130 and perform a conversion event. The conversion may or may not be immediately subsequent to viewing the fifth advertisement. For example, the advertisements may be for a particular car company to drive user interest in a car. The user may gain interest in the car and visit the car company's website to view additional information at another time. Thus, the user accessed the advertiser 130's website and converted after being provided ads from a plurality of content systems 120.

A conversion event need not occur in an electronic form. For example, many consumer products companies may register a conversion when a user purchases the consumer product, e.g., toothpaste, in a physical location. The conversion event at the physical location may be identified with a user (e.g., where the user provides an identifier such as an email address to the advertiser) and various advertisements that were viewed by the user. For example, the user may use an electronic check-out on a user's mobile phone that, with the user's consent, associates the purchase with a user profile and a modality set. The conversion tracking module 102 records the conversion and the set of advertising modalities associated with the conversion in the conversion event logs 104.

The conversion event logs 104 store information for conversions for a large number of users and advertising modalities. Generally, each entry in a conversion event log 104 contains a record of the advertising modalities that provided advertisements to the user who converted, along with information identifying the user. Thus, for any given modality, the system can determine users who converted after having seen an advertisement via the given modality. The entry may also include a description of the conversion event. The modality value module 103 uses the conversion events and the set of advertising modalities associated with the conversion events to determine the value of each advertising modality in the advertising process for the successful conversion. The modality value module 103 periodically determines the number of users who have converted to an advertiser through various sets of advertising modalities. For example, one user may convert after viewing an advertisement via a single advertising modality, for which the modality set is a single advertising modality, while another user may convert after viewing an advertisement via a first, second, and third advertising modality, for which the modality set includes the first, second, and third advertising modality.

The selection of advertising modalities by the modality value module 103 may be determined by any suitable attribute of the advertisements. Advertising modalities may be selected based on any attributes of the advertisements provided to users and can serve to group individual instances of advertisements provided by the advertising attribution system 100 or by other entities to the user. For example, the advertising modalities may be selected based on the content provider 120 that displayed the advertisement, on the type of advertisement (e.g., an image, video, or audio), the size of the advertisement, the time the advertisement was shown to the user, and other suitable attributes. The advertising modalities selected for attribution may differ on one or more of these attributes. Accordingly, a possible advertising modality selection includes advertisements served on a first content provider, advertisements served on a second content provider by a video advertisement, advertisements served on the second content provider by picture equal to or smaller than 200×300 pixels, and advertisements direct-mailed within the last month. Thus, the advertisements provided to the user may be grouped in any suitable set of advertising modalities of interest to the operator of the advertising attribution system 100.

For each modality set associated with an advertiser, the modality value module 103 determines the population of users who viewed the advertisements provided by the modality set, and the percentage of viewers who converted. The modality set is designated S, a population of users is designated P, and the conversion rate is designated C. The value to the advertiser of a conversion event is termed V. For the purposes of the following discussion, the population of users is discussed with respect to a particular advertiser. The population of users may have also viewed additional advertisements for other advertisers which may have resulted in additional conversions to those advertisers. For this discussion, the conversions relating to the other advertisers are not considered. Thus, P is the set of all users whose conversions are tracked with respect to conversions to the advertiser. $P_i$ is the $i^{th}$ modality set (a subset of P) of users that were served ads from only the $i^{th}$ subset of advertising modalities. Stated another way, this is the set of users exclusive to the $i^{th}$ subset of advertising modalities.

To determine the value of a modality set including a single modality j, the value of the conversion event can be attributed to the single modality j in full. For a modality set including multiple modalities, the value of each subset of modalities is determined and the incremental value added by each modality to the set as a whole is determined.

Figure 2A:
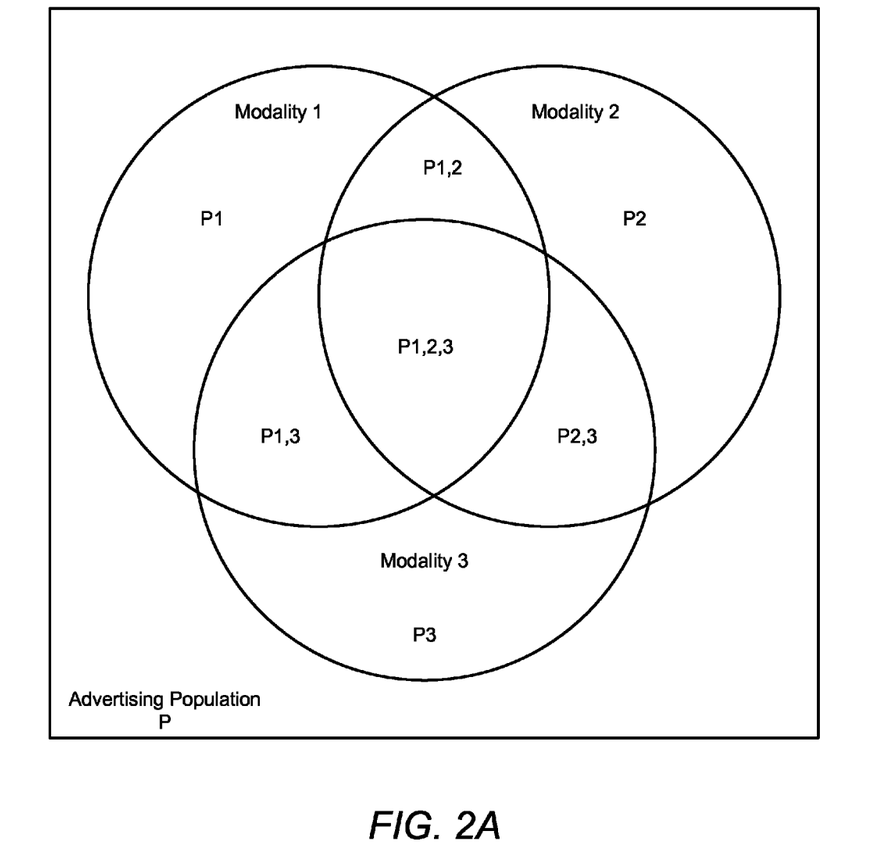
FIGS. 2A-C illustrate an example modality set comprising three modality populations.
Figure 2B:
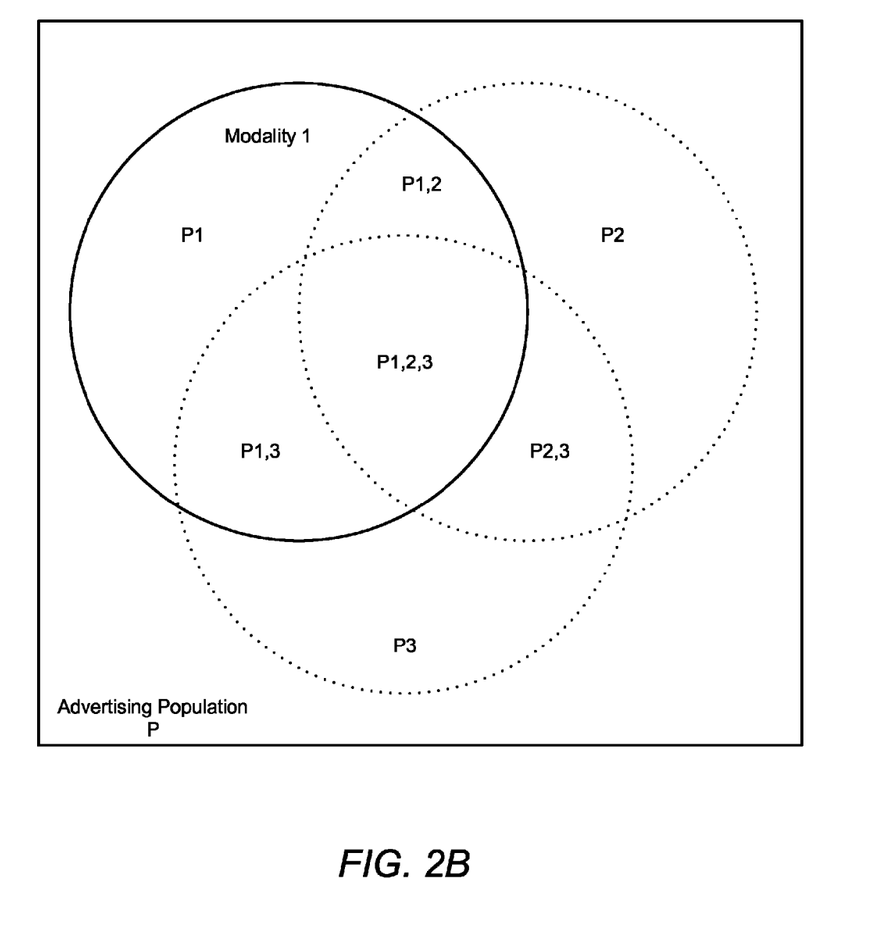
Figure 2C:
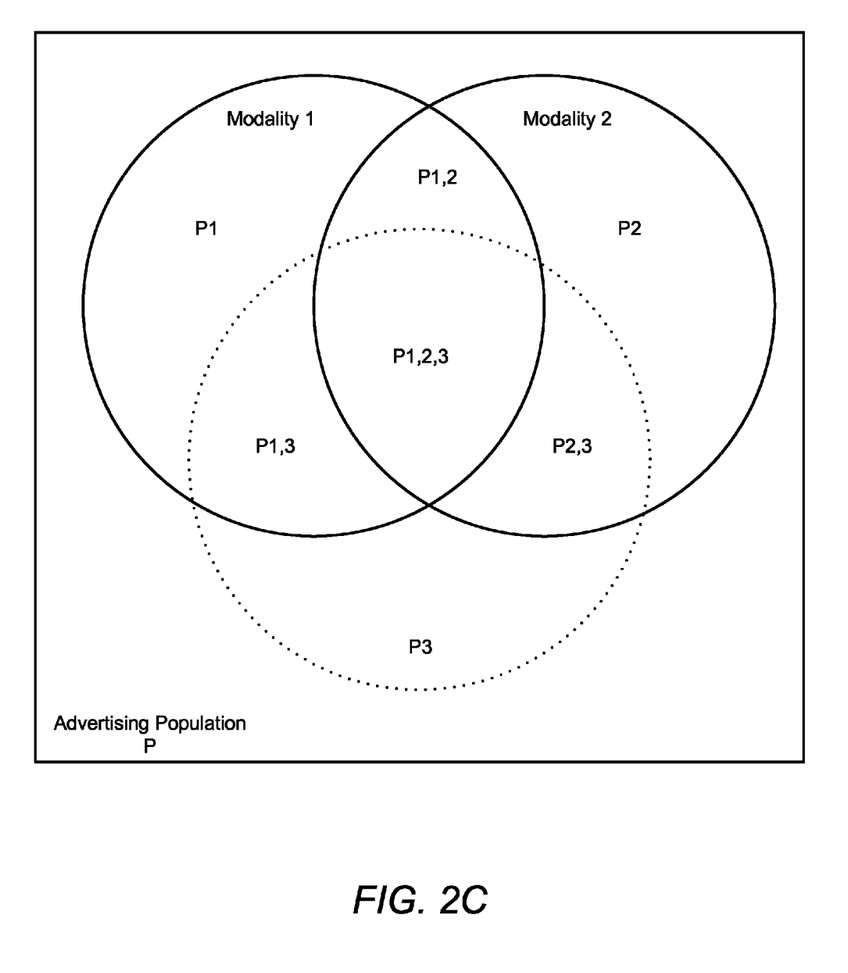

FIGS. 2A-C illustrate an example modality set comprising three modality populations according to one embodiment. The population $P_1$ corresponds to a user population that viewed a first modality's advertisement only, population $P_2$ corresponds to a user population that viewed a second modality's advertisement only, and population $P_3$ corresponds to a modality user population that viewed the third modality's advertisement only. In the example that follows, the value attributable to each modality is determined for conversions that occurred based on the modality set $S_{1,2,3}$ comprising all three modalities. Populations for users that viewed more than one modality's advertisement are designated $P_{1,2}$, $P_{2,3}$, and $P_{2,3}$. The population for the modality set is population for all three modalities, $P_{1,2,3}$. Each of these modality populations is associated with a corresponding conversion rate, such as $C_1$, $C_{2,3}$, and $C_{1,2,3}$. A general advertising population, P, designates the remaining users who have not viewed any of the modalities' advertisements from the modality set. Some of these users also convert with the advertiser and the conversions by these users are tracked. This general population conversion rate is C, and is the rate per hundred of users at which users convert in the associated population.

To determine the value of conversions attributable to each advertising modality for conversions in modality set $S_{1,2,3}$, the value of each modality subset is determined exclusive of other modalities. For modality set $S_{1,2,3}$, the modality subsets used to determine the value of the advertising population comprise $\{S_1, S_2, S_3, S_{1,2}, S_{1,3}, S_{2,3}, S_{1,2,3}\}$. The modality subsets may also include a null modality subset $S_0$ corresponding to the general advertising population P that is not displayed any advertisements from these three modalities. Thus, the general advertising population P allows a comparison of the value of each modality subset a baseline value.

To determine a value attributable to each of the modality subsets, the populations associated with the subset are multiplied by the conversion rate that would apply to the population in the absence of any modalities that are not included in the modality subset. The population is matched with the maximum number of modalities remaining in the modality subset. For example, for modality subset $S_{1,3}$, modalities 1 and 3 provide advertisements. Thus, population $P_{1,2}$ is matched with the population with the maximum number of modalities in the subset, in this case $P_1$. Population $P_2$ is matched with the population with the maximum number of modalities, in this case the general population P. Population $P_{1,2,3}$, is matched with the population with the maximum number of modalities in the subset remaining, in this case $P_{1,3}$.

The value V of the general null modality subset $S_0$ is determined by the conversion rate $C_0$ of the general advertising population P if applied to the advertising population P as well as the other advertising populations that are not provided advertisements in this modality subset. Since in the null modality case, no modalities provide advertisements, the conversion rate for the various populations is inferred to be the general conversion rate $C_0$. Thus, the value V measured in the number of converting users for $S_0$ is $C*(P+P_1+P_2+P_3+P_{1,2}+P_{1,3}+P_{2,3}+P_{1,2,3})$. In one embodiment, rather than using a conversion rate, a revenue rate for each population is used to determine the value of each population. The revenue rate may be a suitable alternative where the value of each conversion differs between population groups.

FIG. 2B illustrates determining the value of the subset $S_1$ according to one embodiment. As shown by this figure, when only modality 1 provides ads, the population of users that were shown an advertisement by more than one modality, i.e., $P_{1,2}$, $P_{1,3}$, and $P_{1,2,3}$, are now considered to have only been shown ads by modality 1. The conversion rate $C_1$, for the users who actually only viewed the modality 1's advertisement, is treated as the conversion rate that would have been obtained by the populations that were actually provided advertisements by additional modalities. Thus, to determine the value for $S_1$, the conversion rate for $P_1$ is used as the conversion rate for $P_{1,2}$, $P_{1,3}$, and $P_{1,2,3}$. The value for $S_1$ is the conversion rate of the users who viewed advertisements in the modality subset $S_1$ and the value of any users who would have converted even without advertisements. The value $V_1$ for $S_1$ is: $C_1*(P_1+P_{1,2}+P_{1,3}+P_{1,2,3})+C*(P+P_2+P_3+P_{2,3})$. Respective determinations for $V_2$ and $V_3$ are also computed in a similar manner.

FIG. 2C illustrates determining the value of the modality subset $S_{1,2}$ according to one embodiment. In this example, modalities 1 and 2 provide advertisements without any advertisements provided by modality 3. Thus, the population $P_{1,2,3}$ is treated as though it was provided ads by modalities 1 and 2 only, and therefore is presumed to match the conversion rate of population $P_{1,2}$. Thus, the expected conversion rate of $P_{1,2,3}$, will be the same as $P_{1,2}$. The value $V_{1,2}$ for $S_{1,2}$ is: $C_1*(P_1)+C_2*(P_2+P_{2,3})+C_{1,2}*(P_{1,2}+P_{1,2,3})+C*(P+P_3)$. Respective determinations for $V_{2,3}$ and $V_{1,3}$ are also computed.

The value $V_{1,2,3}$ for modality subset $S_{1,2,3}$, which in this case includes each of the modalities in the target modality set, can be determined by multiplying each conversion rate with the associated population and summing the results.

Figure 3:
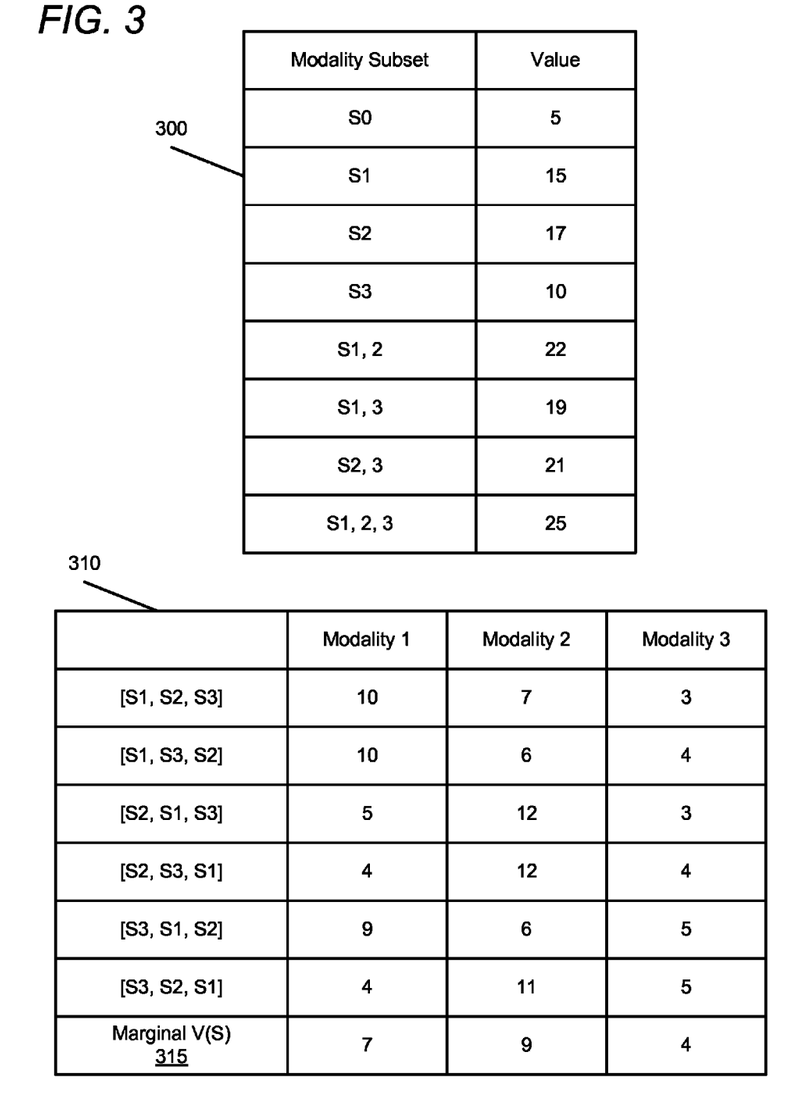
FIG. 3 illustrates an example of a determination of the marginal value for each modality using the value determined for each modality subset.

FIG. 3 illustrates an example of a determination of the marginal value for each modality using the value determined for each modality subset, according to one embodiment. Value table 300 illustrates an example set of values V associated with each modality subset for the modality set $S_{1,2,3}$ as calculated above. These values are indicative of the value to the modality if only the modality subset provided advertisements to the population P. Using the values for each modality subset, a table of marginal values 310 is generated. The marginal value for each modality is generated by determining the marginal value for the publisher that is dependent on the order in which a user views an advertisement by the modality. In the three-modality example, a user may view a particular modality's advertisement first, second, or third. Depending on the order in which the user views the modality's advertisement, the user's likelihood of converting may be more or less strongly increased. Thus, marginal values for the modality are generated for each permutation of ordering. Each permutation is listed on the left side of the marginal value table 310. The table of marginal values 310 indicates the marginal increase of value for including each modality as part of the set of modalities shown to a user. For the first row, modalities are treated as shown to the user in an order of 1, 2, 3, that is an advertisement from advertising modality 1, then an advertisement from advertising modality 2, then an advertisement from advertising modality 3. When the ad from the first modality is shown, the value for showing the first modality is compared to the baseline value when no advertisement is shown to the user, the value associated with $S_0$. The marginal value of $S_1$ is the improvement of $V_1$ over the value $V_0$. These values are listed in the value table 300 for reference in this example. The marginal value for modality 1 when ordered $S_1$, $S_2$, $S_3$ is thus $V_1-V_0$, or 15-5 for a value of 10, as shown in the marginal value table 310.

The marginal value of the next modality in this order is the marginal value of modality 2. Adding modality 2 to the set of modalities yields the modality subset $S_{1,2}$. The marginal value is determined by reducing the value of this subset by the value of the previous subset in the order, $S_1$. Thus, $V_{1,2}$ minus $V_1$, or 22 minus 15, is 7. To determine the marginal value of modality 3, modality 3 is added to the subset of modalities to yield $S_{1,2,3}$. The value for this subset is subtracted from the previous subset to determine the marginal value. Specifically, $V_{1,2,3}$ minus $V_{1,2}$. The remaining order permutations are determined similarly and the resulting values are entered in the marginal value table 310. Using the marginal value of the order permutations, a marginal value 315 for the modality is determined as the average of individual modality values from each order permutation. In the marginal value table 310 shown here, the marginal value 315 for each modality is the average of each column. The marginal value 315 for each modality indicates the actual value provided by each modality in increasing conversion rates of users. Thus, as shown in table 310, modality 2 has the highest marginal value (9), followed by modality 1 (7), and then modality 3 (4). This result means that though the user visited all three modalities, the advertisements shown by modality 2 have the greatest impact on conversions relative to modalities 1 and 3. This impact is shown irrespective of the order that users visit each modality. In this example, only three modalities are shown, but in practice there may be a dozen or more modalities (even several hundreds or thousands of modalities) that provide an advertisement to the user prior to a conversion.

In an alternative determination of marginal value, rather than enumerate every permutation of advertising modalities, each modality is only considered if it increases the value to the advertiser when added to the already-existing advertising modalities. For example, for certain combinations of advertising modalities, there may be no users who were served that combination of advertising modality. That is, the value of adding modality 3 to modalities 1 and 2 may be zero.

In addition, the calculation may automatically treat different orders of enumeration of advertisers for the same modality subset as having the same value. That is, the value of adding advertising modality 3 is the same whether the prior advertising modalities were $V_{1,2}$, or $V_{2,1}$. Thus, the calculation may determine the marginal value of an advertising modality by iterating over each set of advertisements that may appear prior and subsequent to the advertising modality in the set of advertising modalities, while omitting the advertising modalities that do not add any marginal value.

Figure 4:
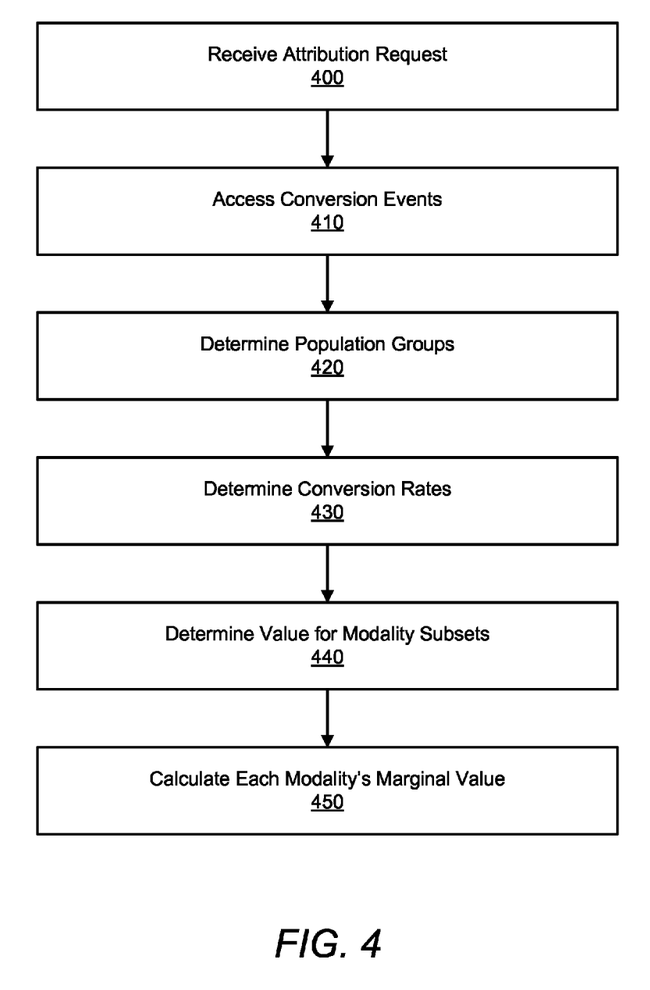
FIG. 4 is a flowchart for attributing value to modalities.

FIG. 4 is a flowchart for attributing value to modalities according to one embodiment. The modality value module 103 receives 400 a request to determine the attribution value for a modality for a conversion event associated with a modality in a set of modalities that provided advertisements to the converted user. The modality value module 103 accesses 410 the conversion events stored in the conversion event logs 104. The modality value module 103 accesses 410 events related to the conversion event by identifying the modalities associated with the requested conversion event and accesses 410 the conversion events from the conversion event logs 104 that match the requested conversion event and conversion events associated with the modalities.

Using the retrieved events, the modality value module 103 determines population groups 420 of users associated with modality subsets of the modality set. Using the population groups and the conversion events, the conversion rates are determined 430 for each modality subset. The conversion rate determination 430 is performed as described with reference to FIGS. 2-3. Next, the value for each modality subset is determined 440 by determining the number of converters for each combination of modalities in the modality subset by inferring the conversion rates of populations as described above. Finally, the value for each modality subset is used to calculate 450 the modality's marginal value. The modality's marginal value in one embodiment is based on marginal values associated with the order permutations of the modalities. The average of the marginal values of the order permutations is used for the modality's marginal value.

Figure 5:
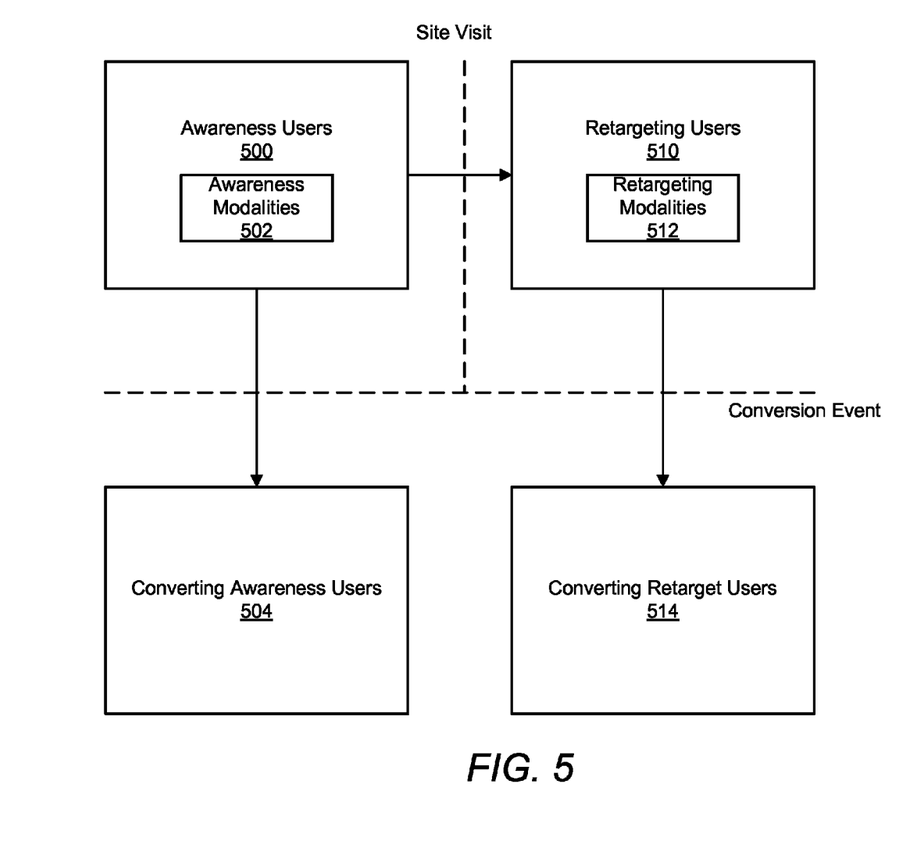
FIG. 5 is a conceptual illustration for applying conversion values to awareness and retargeting users.

FIG. 5 is a conceptual illustration for applying conversion values to awareness and retargeting users according to one embodiment. Advertisers generally target different types of users with different levels of knowledge about the advertiser. A first group, termed awareness users 500, is targeted by advertisers to introduce awareness of the advertiser and solicit interest in the advertiser. The awareness users 500 typically do not have awareness of the advertiser within a scope measured by the persistent identifier. For example, an awareness user 500 has not visited the website of the advertiser within a period of time measured by the advertising attribution system 100. This could be an extended period of time, such as several months.

A second group of users is termed retargeting users 510, which are users that have previously demonstrated awareness or interest in the advertiser. Typically the retargeting users 510 are users that visited the advertiser's website but have not converted. For example, a retargeting user 510 in one embodiment is defined as any user that visited the advertiser's site within the past five days. Depending on the nature of the advertiser, an awareness user 510 may be identified by a variety of methods, of which a visit to the advertiser's site is just one. For example, a retargeting user can also be defined by an in-person visit of the user to an advertiser's showroom. The in-person visit may be used as a proxy to determine that the user is aware of the advertiser. The in-person visit may be linked to a user profile associated with the user by using any identifiable information, such as a user's address. Retargeting users 510 are typically targeted by advertisers to produce conversions from users who have already shown some level of interest or awareness in the advertiser, and typically have higher conversion rates relative to the awareness users 500. Each group of users is associated with a base conversion rate.

Each group of users may be targeted by different sets of modalities. Specifically, awareness modalities 502 are the modalities that provide advertisements to awareness users 500, while retargeting modalities 512 are the modalities that provide advertisements to retargeting modalities 512. The modalities within each group are not necessarily unique, and thus a given modality may be used within multiple groups. For example, modalities may target advertisements to awareness users 500 and retargeting users 510. Such a modality would be included in the group of awareness modalities 502 and retargeting modalities 512. Each group of users may also produce conversions associated with the group. Converting awareness users 504 are awareness users 500 that converted with the advertiser. As described above, the converting awareness users 504 are each associated with a user profile identifying advertisements that have been viewed by the converting awareness user. Likewise, converting retargeting users 514 are retargeting users 510 that converted with the advertiser. The advertisers that have shown retargeting users 514 advertisements may include retargeting modalities 512 as well as awareness modalities 502. For example, a user may originally have been an awareness user 500 that viewed advertisements from awareness modalities 502 and subsequently visited the advertiser's website but not converted within a timeframe to be treated as a converting awareness user 504. Subsequent to the visit to the advertiser's website, this user may now be treated as a retargeting user 510 and provided advertisements from the retargeting modality 512. Since retargeting users 510 are more likely to convert than awareness users 500, awareness modalities 502 in one embodiment are provided attribution to account for the value of generating retargeting users 510. In one embodiment, the attribution is determined relative to converting retargeting users 514 that were not presented any retargeting advertisements from the retargeting modalities 512.

Figure 6:
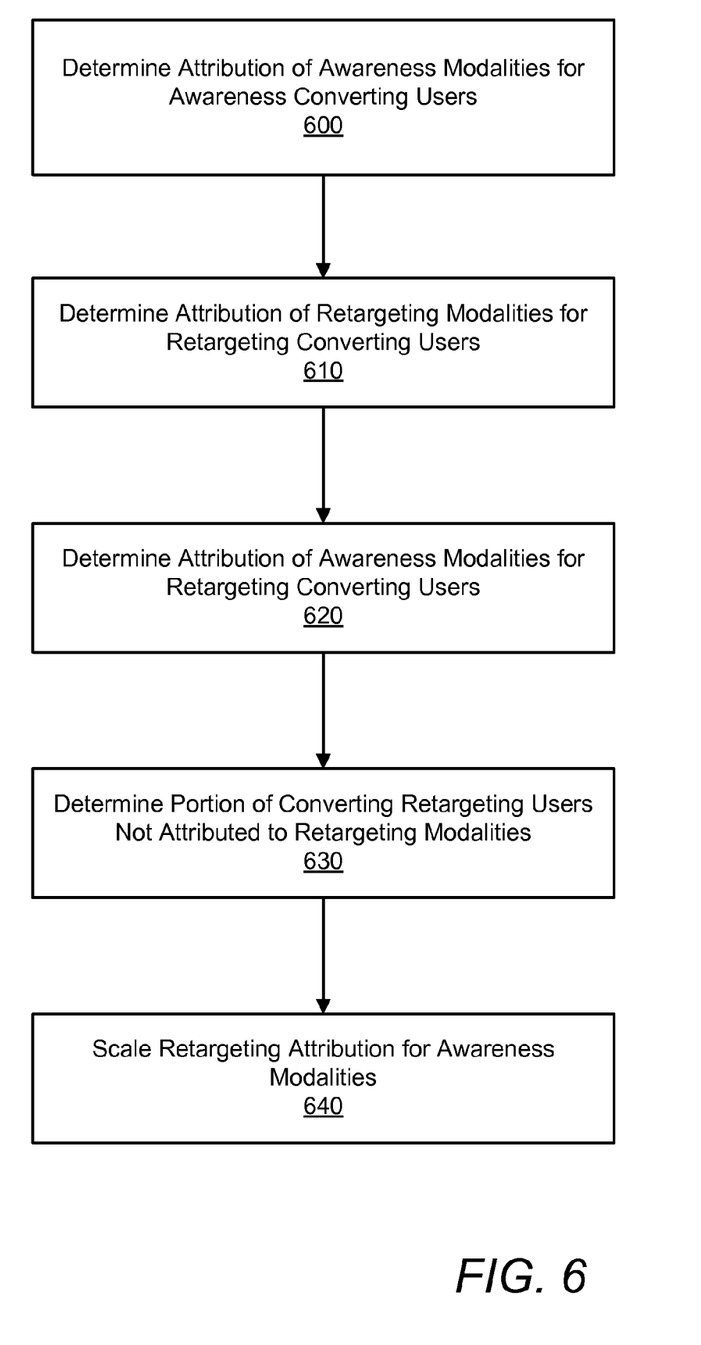
FIG. 6. illustrates a method for assigning attribution for awareness modalities and retargeting modalities.

FIG. 6 illustrates a method for assigning attribution for awareness modalities and retargeting modalities according to one embodiment. This method provides a means for determining attribution for the environment of users and modalities shown in FIG. 5, though it may be applied to any scenario where users are targeted by separate groups of modalities where one type of users may be subsequently treated as another type (here, awareness users may become retargeting users). Additional applications of this method apply to any subset of a population where the baseline conversion rate for that subset differs from the population as a whole. For example, women may be treated as a population subset for an advertiser of women's products. The method shown in FIG. 6 is performed by the modality value module 103 in one embodiment. Initially, attribution of awareness modalities is determined 600 with respect to awareness converting users. In one embodiment, the attribution is performed using an attribution method as described with reference to FIGS. 2-4. In this case, the population P is the group of awareness users 500, and the modality subsets S are determined using awareness modalities 502. Conversion rates C are determined with respect to converting awareness users 504. Next, an attribution is determined 610 for the retargeting modalities 512 relative to converting retarget users 514. In the embodiment using the attribution methods described above, the population P is the group of retargeting users 510 and the modality subsets S are determined using retargeting modalities 512 with conversion rates C based on converting retarget users 514. Thus, each group of modalities, 502 and 512, is provided attribution for the users specifically targeted by each group.

Attribution is determined 620 for awareness users 500 based on converted retarget users 514. This attribution credits awareness modalities 502 with the increased likelihood that users convert once the users have become retargeting users 510, despite that users did not convert in a timeframe or manner to be captured as converting awareness users 504. In an embodiment using the attribution methods described above, the population P is the group of awareness users 500 and the modality subsets S are determined using awareness modalities 502 with conversion rates C based on conversions of converting retarget users 514. Though the number of converting retarget users 514 is generally small relative to awareness users 500, the affect on conversion rates attributable to awareness modalities 502 is generally non-negligible.

In this embodiment, attribution for each conversion is provided to only one set of advertisers. Converting retarget users 514 were provided advertisements by the retarget modalities 512, awareness modalities 502, both, or neither. In this embodiment for providing attribution to the system depicted in FIG. 5, the attribution of retargeting modalities includes attribution of users that were provided advertisements by the retargeting modalities, whether additional advertisements were provided or not provided (such as by awareness modalities 502). Thus, the attribution of awareness modalities 502 for retargeting conversions is reduced in proportion to the retargeting conversions already attributed to retargeting modalities 512. The portion is determined 630 by calculating the converting retarget users 514 that were provided advertisements by retargeting modalities 512 relative to converting retargeting users 514 as a whole. Specifically, the number of converting retargeting users 514 that were shown an advertisement from any of the retargeting modalities 512 (and hence, attribution credit was provided to the appropriate set of retargeting modalities 512) is divided by the total number of converting retarget users 514. This portion indicates the portion of retargeting users whose attribution has already been applied to retargeting modalities 512. The remaining portion is the portion of retargeting users that have not been attributed to any advertising modality. The resulting percentage is used to scale 640 the retargeting attribution for the awareness modalities 502.

Applications of Attribution Value

There are a variety of different ways that the attribution value of modalities can be used. For example, since modalities may be dynamically defined, attribution may be used to determine the relative contribution of various modalities to the conversion of users as a whole. For example, it allows the comparison between types of advertising, the timing of advertising, and the frequency of advertising to user conversions. This may be of particular interest for certain advertising types that are traditionally difficult to measure, such as fliers or by mail, or the efficacy of different advertisement sizes. Since these can be identified with users and conversions (e.g., by using an address or other common identifier), the value of these advertisements in conjunction with other advertising campaigns can be determined.

Another use is to determine the amount of a payment to provide to each publisher of a modality for a given conversion event for a given user who has seen ads through multiple different modalities. The marginal value for the modality is based on the modality set that the user converted at. If a conversion event is worth $10, the marginal value M for each modality i in the modality set indicates the contribution of each modality to the conversion and is used to split the $10 among the publishers of the advertising modalities. The marginal value for each publisher is determined as a portion of the marginal value provided by the modality set. Using the example in FIG. 3, Modality 1's marginal value is 7, where the value provided by the combination of modalities 1, 2, and 3 is 20. Modality 1's portion is 7/20 or 35%. Thus, Modality 1 may be paid 35% of the $10 conversion event value, or $3.50. Similarly, Modality 2's contribution is 9/20 of $10, or $4.50, and Modality 3's contribution is 4/20 of $10, or $2. Since the advertising attribution system 100 in embodiments manages advertising and conversion event tracking for tens and hundreds of thousands of interactions, the fast and efficient calculation of value attributable to modalities for a conversion is crucial to effective operation of the advertising attribution system 100.

The advertising attribution system 100 may also take into account the marginal value for each modality in determining whether to provide the modality's advertisement to a client device 110. Since the marginal value for a modality changes based on modalities that have already provided advertising to the user, advertising attribution system 100 can determine prospectively what the marginal value to the modality is likely to be if the modality converts on the advertisement. Thus, knowing the sequence of modalities that have already provided an advertisement, the system may determine the marginal value to an advertiser if a user converts after being served that advertisement. The marginal value may be determined by identifying the marginal value to the modality using a modality set comprising the modality and the modalities that have already provided an advertisement to the user. This marginal value can be used in conjunction with a calculated likelihood a user will convert after viewing the advertisement (or the "lift" of the advertisement) to determine whether it is advantageous to the publisher of the modality to serve that advertisement.

Thus the advertising attribution system may be less likely to serve an ad where the marginal value of the ad to the modality is reduced. For example, the value to the publisher of being the first advertising modality to provide the advertisement to the user may be significantly higher relative to being a second, third, or fourth modality. In many other attribution methods, such as a last-impression attribution, a decision to provide the advertisement to the user is irrelevant to the actual value to the advertiser that is added by the ad modality in providing the advertisement.

Additional Considerations

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

What is claimed is:

1. A computer-implemented method for attributing value among a plurality of advertising modalities for a conversion event associated with an advertiser and a modality set comprising the plurality of advertising modalities, each advertising modality defining at least one attribute of an advertisement, comprising:
   accessing in a conversion event log, conversion events for the advertiser, where each conversion event is associated with a user;
   determining, by a processor, a population of users and conversion rate of the users with respect to a plurality of modality subsets of the modality set, the conversion rate of each modality subset based on a subset of users that received advertisements via the modality subset, the modality subsets including each combination of modalities in the modality set;
   determining, by the processor, a conversion value of a plurality of subsets of users, each subset of users associated with each modality subset, the conversion value of each subset of users representing the value of delivering advertisements via the associated modality subset to the exclusion of other modalities in the modality set;
   determining, by the processor, a plurality of marginal values for a target advertising modality in the modality set based on differences in conversion values created by the addition of the target advertising modality to each modality subset that does not include the target advertising modality; and
   attributing, by the processor, an advertising value to the target advertising modality in the modality set based on the plurality of marginal values.

2. The computer-implemented method of claim 1, further comprising paying a publisher for the conversion event based on the attributed value of the target advertising modality.

3. The computer-implemented method of claim 1, wherein the modality subset includes a null modality subset.

4. The computer-implemented method of claim 1, wherein the conversion value associated with each modality subset indicates the conversion rate of a population for the modality subset is based on a match of advertisements provided to the population and the modalities in the modality subset.

5. The computer-implemented method of claim 1, wherein the plurality of marginal values is based on order permutations of the conversion value associated with each modality subset.

6. The computer-implemented method of claim 1, wherein each of the plurality of advertising modalities groups advertisements based on an attribute of an advertisement.

7. The computer-implemented method of claim 6, wherein the attribute is selected from the group consisting of: the delivery mechanism of the advertisement, size of the advertisement, time of day the advertisement was served, and publisher of the advertisement.

8. A non-transitory computer-readable medium for attributing value among a plurality of advertising modalities for a conversion event associated with an advertiser and a modality set comprising the plurality of advertising modalities, each advertising modality defining at least one attribute of an advertisement, the non-transitory computer-readable medium comprising instructions that when executed by a processor cause the processor to perform steps of:

accessing in a conversion event log, conversion events for the advertiser, where each conversion event is associated with a user;

determining a population of users and conversion rate of the users with respect to a plurality of modality subsets of the modality set, the conversion rate of each modality subset based on a subset of users that received advertisements via the modality subset, the modality subsets including each combination of modalities in the modality set;

determining a conversion value of a plurality of subsets of users, each subset of users associated with each modality subset, the conversion value of each subset of users representing the value of delivering advertisements via the associated modality subset to the exclusion of other modalities in the modality set;

determining a plurality of marginal values for a target advertising modality in the modality set based on differences in conversion values created by the addition of the target advertising modality to each modality subset that does not include the target advertising modality; and attributing an advertising value to the target advertising modality in the modality set based on the plurality of marginal values.

9. The computer-readable medium of claim 8, wherein the instructions further cause the processor to perform a step of paying a publisher for the conversion event based on the attributed value of the target advertising modality.

10. The computer-readable medium of claim 8, wherein the modality subset includes a null modality subset.

11. The computer-readable medium of claim 8, wherein the conversion value associated with each modality subset indicates the conversion rate of a population for the modality subset is based on a match of advertisements provided to the population and the modalities in the modality subset.

12. The computer-readable medium of claim 8, wherein the plurality of marginal values is based on order permutations of the conversion value associated with each modality subset.

13. The computer-readable medium of claim 8, wherein each of the plurality of advertising modalities groups advertisements based on an attribute of an advertisement.

14. The computer-readable medium of claim 13, wherein the attribute is selected from the group consisting of: the delivery mechanism of the advertisement, size of the advertisement, time of day the advertisement was served, and publisher of the advertisement.

15. A system for attributing value among a plurality of advertising modalities for a conversion event associated with an advertiser and a modality set comprising the plurality of advertising modalities, each advertising modality defining at least one attribute of an advertisement, comprising:

a processor configured to execute instructions; and a non-transitory computer readable medium including instructions, that when executed by the processor cause the processor to:

access in a conversion event log, conversion events for the advertiser, where each conversion event is associated with a user;

determine a population of users and conversion rate of the users with respect to a plurality of modality subsets of the modality set, the conversion rate of each modality subset based on a subset of users that received advertisements via the modality subset, the modality subsets including each combination of modalities in the modality set;

determine a conversion value of a plurality of subsets of users, each subset of users associated with each modality subset, the conversion value of each subset of users representing the value of delivering advertisements via the associated modality subset to the exclusion of other modalities in the modality set;

determine a plurality of marginal values for a target advertising modality in the modality set based on differences in conversion values created by the addition of the target advertising modality to each modality subset that does not include the target advertising modality; and attribute an advertising value to the target advertising modality in the modality set based on the plurality of marginal values.

16. The system of claim 15, wherein the instructions further cause the processor to pay a publisher for the conversion event based on the attributed value of the target advertising modality.

17. The system of claim 15, wherein the modality subset includes a null modality subset.

18. The system of claim 15, wherein the conversion value associated with each modality subset infers the conversion rate of a population for the modality subset is based on a match of advertisements provided to the population and the modalities in the modality subset.

19. The system of claim 15, wherein the plurality of marginal values is based on order permutations of the conversion value associated with each modality subset.

20. The system of claim 15, wherein each of the plurality of advertising modalities groups advertisements based on an attribute of an advertisement.

* * * * *